Aug. 29, 1967  S. S. AIDLIN ET AL  3,338,373
AUTOMATIC APPARATUS FOR ORIENTING AND FEEDING
BOTTLES, AND THE LIKE
Filed Nov. 28, 1966  2 Sheets-Sheet 1

STEPHEN H. AIDLIN
Samuel S. Aidlin
INVENTORS.

BY

ATTORNEY

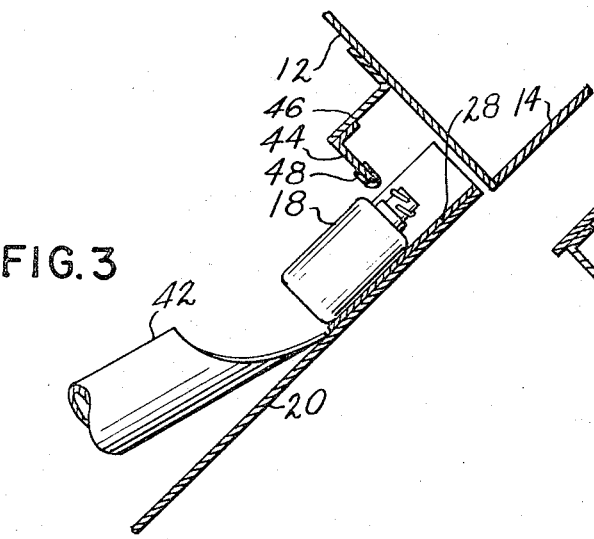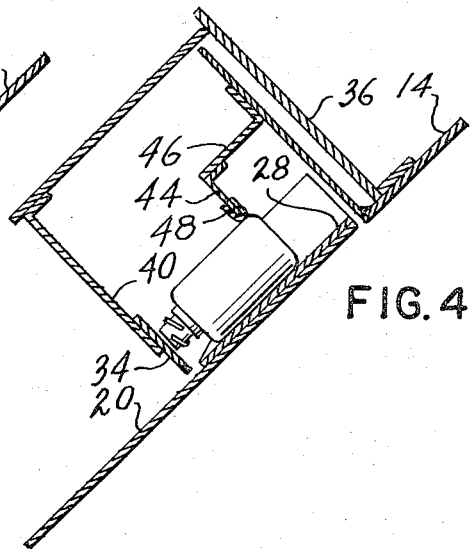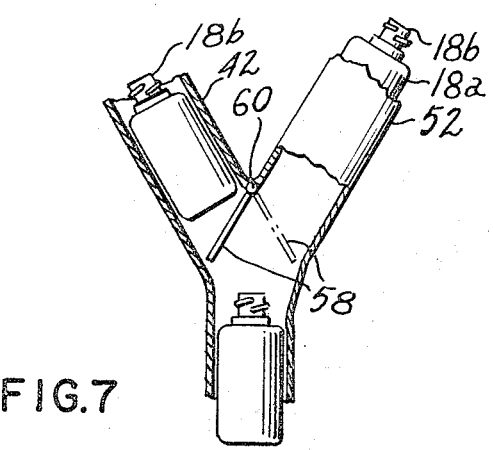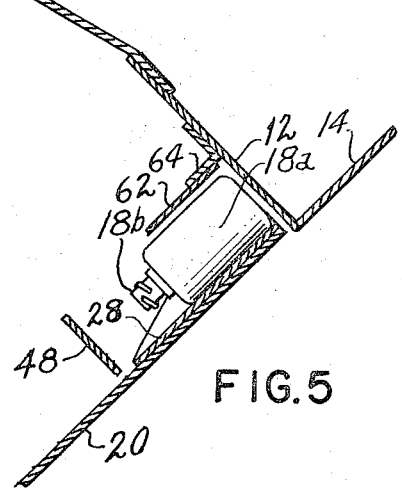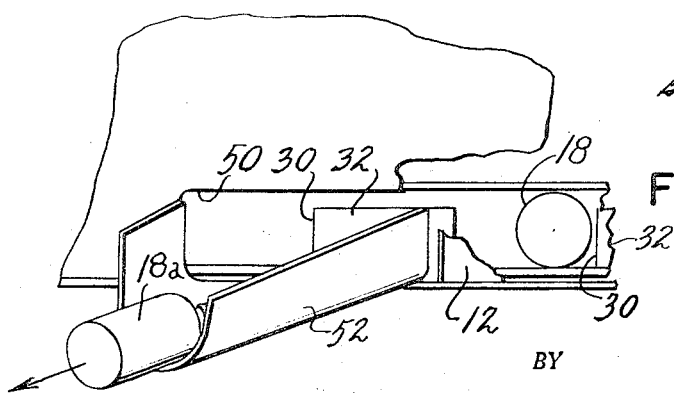

United States Patent Office 3,338,373
Patented Aug. 29, 1967

3,338,373
AUTOMATIC APPARATUS FOR ORIENTING AND FEEDING BOTTLES, AND THE LIKE
Samuel S. Aidlin, 214 Beaumont St., and Stephen H. Aidlin, 3855 Shore Parkway, both of Brooklyn, N.Y. 11235
Filed Nov. 28, 1966, Ser. No. 597,272
4 Claims. (Cl. 198—33)

ABSTRACT OF THE DISCLOSURE

Hopper feed apparatus for bottles including a tilted, rotating bottles-unscrambling and moving ring that picks up bottles in radial recesses. A fixed guard disposed at the inner end of the ring is interrupted at the top of the hopper to permit bottles to drop out through the opening into a chute. Bottles disposed with their bases towards center of hopper drop through opening into chute. Others are frictionally held in the openings and are discharged base foremost, through opening in hopper wall adjacent thereof, assisted by stream of compressed air.

---

The present invention relates to automatic apparatus for feeding and orienting bottles or like articles having neck-like formations at one end and, more particularly, to such apparatus of the hopper feed type.

Numerous types of hopper feed apparatus for feeding and orienting bottles or like articles have heretofore been known. In most instances, such apparatus was capable of feeding only a part of the bottles moved by the apparatus; namely, only those bottles which were picked up in a certain position by the rotary member of the hopper feed, all others being discharged back into the hopper. Obviously, such apparatus supplied properly-oriented bottles to the point of delivery at a necessarily limited rate of speed.

Even such prior art apparatus designed to orient and feed all bottles picked up by the rotary member of the hopper, because they had a single means for the discharge of articles from the apparatus, and because of the necessity of adjusting the position of such bottles within the hopper before feeding or while feeding, required a slowed down feeding operation and limited the rate of discharge or supply of oriented bottles from the apparatus.

It is a primary object of the present invention to provide bottle-orienting and feeding apparatus, of the character described, which will orient and feed all bottles picked up by its rotary member without returning or discarding any of them back into the hopper.

It is another object of the present invention to provide bottle-orienting and feeding apparatus, of the character described, which may be operated at greater speed than heretofore possible to thereby supply fed oriented bottles at a higher rate of speed than heretofore possible.

It is still another object of the present invention to provide bottle-orienting and feeding apparatus, of the character described, which will operate at high speed with substantial freedom from clogging or jamming.

It is a further object of the present invention to provide orienting and feeding apparatus for bottles or like articles which is of relatively simple construction and compact; occupying little if any more space than any of the apparatus of the prior art.

The foregoing and other objects and advantages of the bottle-orienting and feeding apparatus of the present invention will become more readily apparent to those skilled in the art from the embodiments thereof shown in the accompanying drawings and from the description following. It is to be understood, however, that such embodiments are shown by way of illustration only, to make the principles and practice of the invention more readily comprehensible and without any intent of limiting the invention to the specific details therein shown.

In the drawings:

FIG. 3 is a fragmentary, sectional view, on an enlarged scale, taken on line 3—3 of FIG. 2;

FIG. 4 is a fragmentary, sectional view, on an enlarged scale, taken on line 4—4 of FIG. 2;

FIG. 5 is an enlarged, sectional view taken on line 5—5 of FIG. 2;

FIG. 6 is an enlarged, sectional view taken in line 6—6 of FIG. 2; and

FIG. 7 is a fragmentary, elevational and partly sectional view of one embodiment of a common bottle outlet for the apparatus of the present invention.

Figure 1:
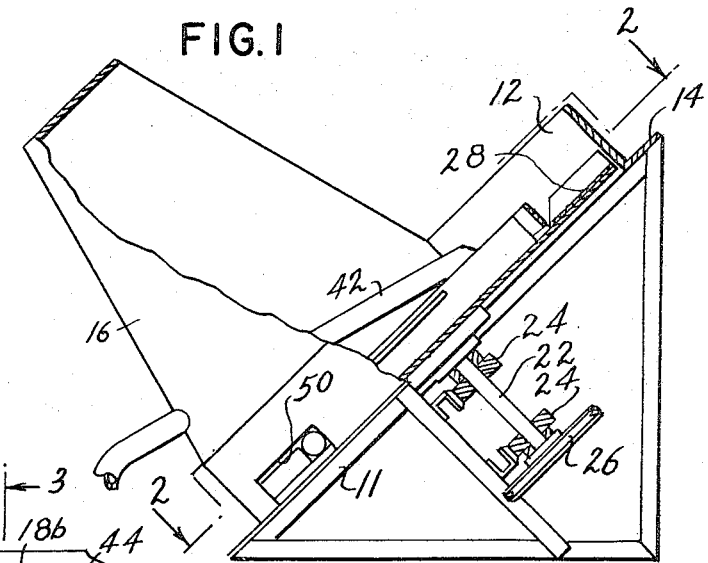
FIG. 1 is a fragmentary, more or less diagrammatic, side elevational and partly sectional and partly broken away view of one embodiment of the bottle-orienting and feeding apparatus of the invention.
Figure 2:
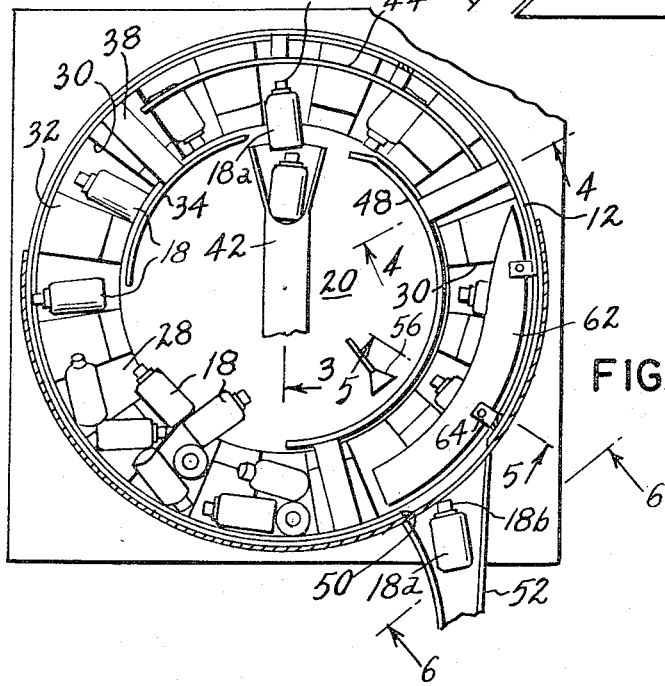
FIG. 2 is a section taken on line 2—2 of FIG. 1.
Figure 2:

Generally stated, the present invention is an improvement over the invention described and claimed in our Patent No. 3,249,203 dated May 3, 1966, in which bottles picked up by a rotary conveyor in a hopper, with their bases facing the center of the hopper, are conveyed out of the hopper, whereas bottles that are picked up with their necks facing the center of the hopper are discharged back into the hopper.

The present invention resides in the improvement whereby the bottles in the rotary conveyor which are disposed therein with their neck portion facing the center of the hopper are likewise discharged from the hopper with their bases or thicker portions first, in properly oriented position, at another location in the hopper.

Referring now, in greater detail, to the embodiment of the invention illustrated in the drawings, the same is shown to comprise a support or frame 10 which may be of hollow, triangular shape, two of its sides being at right angles to one another, and resting on one of said two sides, and the third side 11 forming a hypotenuse connecting the ends of the two sides and forming a sloping base on which is supported, in fixed position, a cylindrical housing 12, as by outwardly-extending flanges 14. The lower portion of the cylindrical housing 12 may be provided with an upwardly-extending enlargement 16, whose interior forms a reservoir for the bottles 18, or the like. Rotatably disposed in the bottom of the cylinder 12 is a circular disc 20 which is of a diameter to substantially fill the cylindrical housing 12. The disc 20 is supported for rotation on an axis perpendicular to the side of the base 11, as by means of the shaft 22, which is suitably connected thereto at its center and extends into the hollow of the frame 10. The shaft 22 may be supported by suitable bearings, as 24, and may carry on its end a pulley wheel 26 which may be operatively connected, as for clockwise rotation, to a motor (not shown).

Mounted on the peripheral edge portion of the disc 20 is an unscrambling ring 28 having radial, open-ended, bottle-receiving recesses 30 provided thereon, defined by elevated, radially-extending spacing partitions 32 which may preferably be of substantial width, as of a width approximately equal to the width of a recess 30 and of a thickness less than the thickness of a bottle 18.

It will be clear that, as the ring 28 is rotated recesses 30 will pick up and receive bottles 18 from a pile of bottles placed in the hopper enlargement 16. To prevent the dropping out of bottles from recesses 30, as they reach, in their ascent, an upper position within the housing 10, there is provided within the housing 10 immediately adjacent the inner edge of ring 28, an upright shield, 34, which extends across the upper portions of the housing 10 from approximately the horizontal axis thereof to a point short of its vertical axis, as from approximately the "9 o'clock" position to a point short of the "12 o'clock" position, when the disc rotates in a clockwise direction. The shield 34 will prevent the dropping out of the bottles from recesses 30 as they ascend to the upper portion of the housing 10 until they reach the top of the housing, as approximately past the "11 o'clock" position.

The shield 34 may be supported in any manner that will not interfere with the movement of bottles in the rotating disc 20. Such means may comprise an upright element 36, mounted on the housing flange 12 and extending above the wall thereof, the horizontal bar 38, extending radially inwardly from the upright element 36, over the housing, and carrying at its inner end the dependent bar 40 to the lower end of which the shield 34 is secured.

Supported over the housing 10 along its vertical diameter is a chute 42, which leads to the exterior of the housing and which is adapted to receive bottles 18 from the recesses 30 as each such recess 30 reaches the top of the housing 10 past the shield 34, which bottles would all drop into the chute by gravity, to be conveyed by it to any desired destination.

In order to have only such bottles fed into the chute 42 that are oriented with the thicker or base portion 18a inwardly disposed and their neck portions 18b outwardly disposed, base foremost, and to prevent bottles disposed in inverted position from being fed into the chute, we provide means for frictionally engaging the base portion 18a of all such inverted bottles to prevent their dropping gravitationally into the chute 42. Such means may comprise an arcuate bar 44 supported across the top of the housing 10 over the ring 28 a distance from the inner edge of the ring 28 greater than the height of the base 18a of a bottle, but less than the total height of the bottle, with the lower edge of such bar 44 disposed at a distance from the surface of the ring 28 less than the thickness of the base portion 18a of the bottle. It will be clear that by such arrangement a bottle disposed with its base forward will not be interfered with by the bar 44, which will be in position to overlie the neck 18b thereof, but a bottle disposed with its neck 18b forward, will have its base 18a frictionally engaged by the inner edge of the bar 44 to prevent its dropping out of its recess 30 until such recess passes the chute 42 and the bottle clears the end of the bar 44.

The bar 44 may be supported in place in any desired manner, as from the underside of one side of an angle bar 46 whose other side is secured to the cylindrical wall 10 of the hopper. If desired, a nosing 48, which may be of resilient character, may be secured to the lower edge of the bar 44, which may, if desired, taper upwardly in the direction of an approaching bottle. It may here be stated that where a bottle 18 is formed of resilient material, as of polyethylene, for instance, angle bar 46 may have its horizontal side rigid; the sides of the bottle 18, in such event, providing the necessary resilience to permit its passage under the bar 44. However, where rigid-walled bottles are to be fed, the horizontal side of the angle bar 46 may be resilient, to achieve the same purpose.

In order to dispense, from the hopper, bottles 18 that are misoriented for discharge into the chute 42, likewise with base foremost, we provide a second barrier or shield 48, adjacent the inner edge of the ring 28 extending from a point inwardly of the end of the bar 44 to a point substantially adjacent the vertical axis of the housing 10, to thereby prevent the discharge of the misoriented bottles 18 from their recesses 30 into the interior of the hopper, as they are moved downwardly by the rotation of the ring 28. There is further provided in the wall of the housing 10, in its lower quarter, as at approximately the space between the "4 o'clock" and "5 o'clock" positions, an opening 50, through which a bottle 18 is disposed with its neck inwardly extending and its base outwardly directed, may be discharged, base foremost, into a second chute 52, under force of gravity which may be reinforced by a jet of compressed air from the outlet nozzle 54 of a tube connected to a source of compressed air.

The bottles discharged into the chutes 42 and 52 may be conveyed to separate destinations; or the chutes 42 and 52 may converge at a suitable place into a common chute 56, forming a structure at the point of junction. To avoid jamming of the bottles at the point of junction, a valve plate 58 may be hinged at the upper point of convergence, as at 60, to be moved by a bottle first approaching the junction from one chute into position of blocking the other chute until the first bottle clears the junction and enters the chute 56.

It may here be stated that the second shield or barrier 48 may be supported in the same manner as the shield 34, as illustrated in FIG. 4 of the drawings. It may also be stated that a top plate 62 may be supported over the ring 28, to overlie it at a height greater than bottle thickness, adjacent the opening 50, which may be supported by brackets 64, secured on the housing wall 10; such plate 62 serving to shield the bottles to be fed through outlet 50 from interference by the pile of bottles that may be contained in the hopper above it.

This completes the description of the automatic bottle-orienting and feeding apparatus of the present invention. It will be readily apparent that the apparatus of the invention, while of relatively simple and uncomplicated construction, is highly efficient for its purpose, serving to discharge all bottles or the like picked up by the unscrambling ring in properly oriented position regardless of the initial position of the bottle in the unscrambling ring.

It will also be apparent that the apparatus of the present invention will supply properly oriented bottles at a high rate of speed to either one or two points of destination, as may be required.

It will be further apparent that numerous modifications and variations may be made in the automatic bottle-feeding apparatus of the present invention by anyone skilled in the art, in accordance with the principles of the invention hereinabove set forth, without the exercise of any inventive ingenuity. We desire, therefore, to be protected for any and all such variations and modifications that may be made within the spirit of the invention and scope of the claims hereto appended.

What we claim is:

1. Apparatus for automatically feeding bottles, or the like, having neck portions at one end, in oriented position with the other end foremost, comprising a circular hopper disposed at an angle to the horizontal, said hopper including a circular peripheral wall, an unscrambling ring rotatably supported within said hopper peripherally thereof, said ring having radially-disposed open-ended bottle-receiving recesses each of a width equal at least to the width of a bottle and of a length equal at least to the length of a bottle, said recesses of a depth less than the thickness of the thicker portion of the bottle, a barrier plate supported within said hopper adjacent the inner end of said ring from a point substantially at the horizontal axis of the hopper to a point short of the vertical axis thereof, on one side of said vertical axis, and a second barrier plate supported within said hopper adjacent the inner edge of said ring from a point spaced from the other side of said vertical axis to a point substantially adjacent the lower end of said vertical axis, the adjacent ends of said barrier walls spaced apart a distance equal, at least, to the width of the inner end of a bottle-receiving recess, means over said upper end of said hopper overlying said ring opposite said space between said adjacent ends of said barrier plates for resiliently, frictionally, slidably engaging a bottle disposed with its neck portion directed toward the center of said hopper, a chute extending from the exterior of said hopper to the interior thereof and opening opposite said space between said adjacent ends of said barrier plates in position to receive therethrough bottles contained in said receiving recesses and disposed therein with their neck portions outwardly disposed, as said ring rotates, and an opening in said peripheral hopper wall formed on said other side of said vertical axis between said horizontal axis and the lower end of said vertical axis adapted to allow gravitational discharge therethrough of bottles disposed in said recesses with their neck portions inwardly directed, and a chute on the exterior of said circular wall opposite said opening therein adapted to receive bottles discharged through said opening.

2. The apparatus of claim 1, wherein said chutes merge into one.

3. The apparatus of claim 2, wherein said chutes merge in a Y joint and a baffle is pivotally supported at said joint by its upper edge for movement into position of selectively closing each said chute.

4. The apparatus of claim 1, wherein means connectable to a source of air under pressure is provided opposite said opening in said wall for applying a jet of compressed air against a bottle disposed in front of said opening.

References Cited

UNITED STATES PATENTS 3,254,753   6/1966   Aidlin _____ 198—33

EVON C. BLUNK, *Primary Examiner.*

EDWARD A. SROKA, *Examiner.*